April 27, 1965  J. MARTIN  3,180,593
VEHICLE ESCAPE SYSTEMS
Filed Feb. 15, 1963  5 Sheets-Sheet 4

Inventor
JAMES MARTIN
By

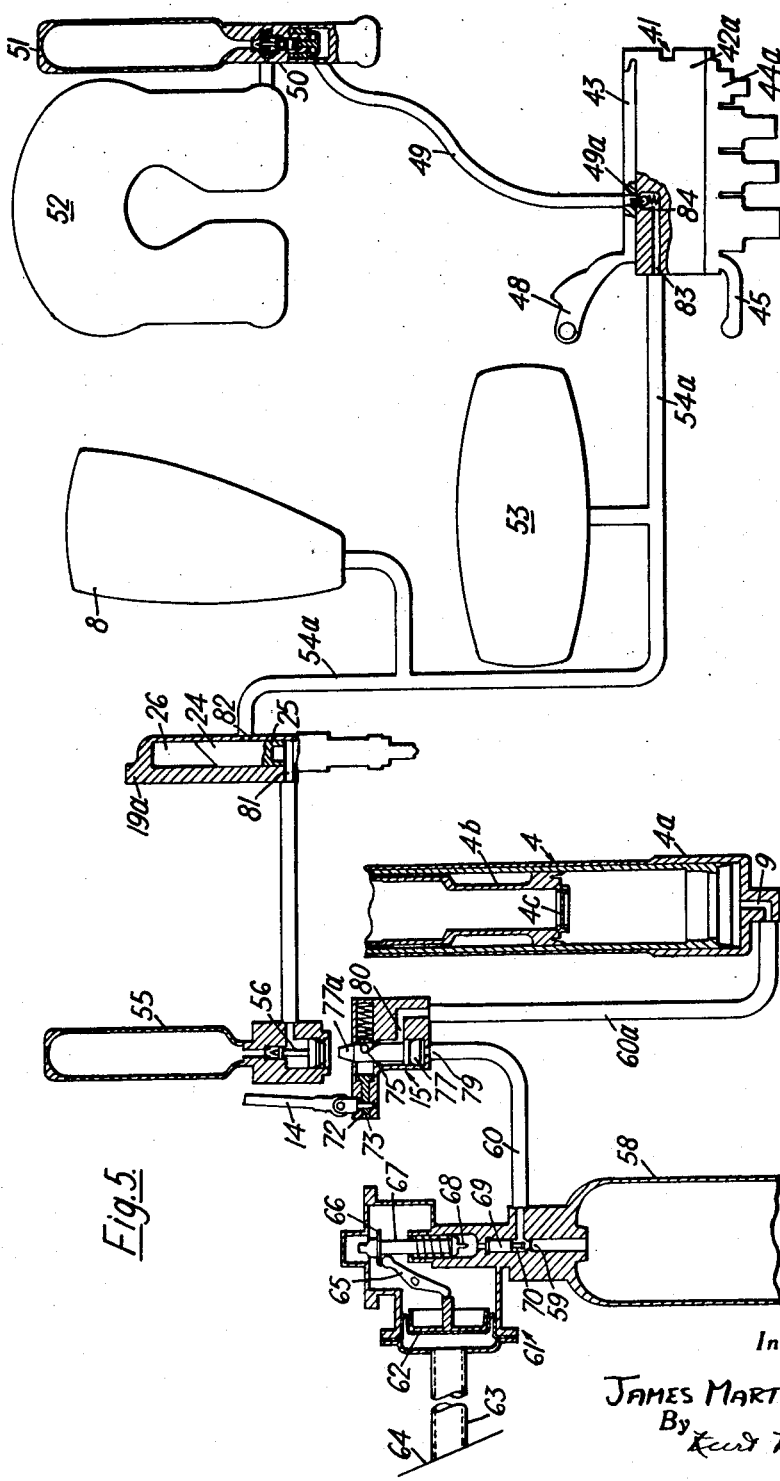

United States Patent Office 3,180,593
Patented Apr. 27, 1965

3,180,593
VEHICLE ESCAPE SYSTEMS
James Martin, Southlands Manor, Southlands Road, Denham, near Uxbridge, Middlesex, England
Filed Feb. 15, 1963, Ser. No. 258,830
Claims priority, application Great Britain, May 18, 1962, 19,204/62; Dec. 5, 1962, 45,994/62
8 Claims. (Cl. 244—122)

This invention relates to vehicle escape systems and in particular to escape systems for aircraft and other analogous vehicles all, for the purposes of the present specification, being called "aircraft."

With the advance that has taken place in the development of aircraft escape systems including ejecting seats, the likelihood of an airman having to enter the water while in his aircraft, for example in the event of an emergency whilst flying over the sea, has been reduced to almost negligible proportions. However, in the case of aircraft operating from naval aircraft carriers, there is an ever present danger of an airman and his aircraft entering the water as a result of the aircraft failing to be arrested by the arrestor devices on the carrier and falling over the side of the carrier, or as the result of engine failure or like mishap during take-off.

It is with this hazard in mind that the escape system of the present invention has been devised, with the object of providing escape facilities particularly adapted to assist an airman to escape satisfactorily from the cockpit of a fully-immersed aircraft.

Research and experimentation in ejecting airmen from their aircraft has shown that undesirable and even harmful effects are suffered by the airman if a normal ejection seat is fired while the aircraft is under water.

For this reason I have devised, as described in my co-pending applications Serial Nos. 258,831, 258,833 and 258,835, all of even date, certain elements of an escape system adapted to achieve safe and automatic escape of an airman from a submerged aircraft.

It is well understood that in the escape of an airman from his aircraft by means of an ejection seat of the kind developed by Martin-Baker Aircraft Co., Ltd., the sequence of operations is generally initiated by the airman pulling down a blind over his face.

Movement of this blind may first actuate mechanism which releases and jettisons the aircraft canopy, further movement of the blind then unlocking the aircraft ejection seat from the aircraft and thereafter initiating the firing of the ejection gun.

As the seat leaves the aircraft a drogue gun is fired to deploy one or more drogues which stabilize the flight of the seat and retard it, if necessary, to a velocity appropriate for deployment of the airman's personal parachute and separation of the airman from the seat.

The drogue or drogues are attached to the seat by a shackle (opened by a sensing device, at an appropriate instant, which also releases the airman's harness) and to the airman's personal parachute ripping and deploying mechanism by a drawline which extends through a line-cutting device which is used to sever the drawline when the airman wishes to escape from the aircraft in an emergency otherwise than by use of the ejection seat. During the normal ejection sequence, the release of the drogue drawline from the shackle enables the line to be pulled clear of the line-cutting device.

From the foregoing, it will be understood that in escape by ejection in an air environment a number of operations occur, some of which could be detrimental to the survival of the airman if the sequence were initiated with the aircraft submerged; moreover, it is desirable that certain other operations should occur in the case of an escape from a submerged aircraft to facilitate survival of the airman whilst and after he has been carried out of the aircraft in the ejection seat. Thus an object of the present invention is to provide an escape system that meets the requirements for escape from a submerged vehicle, particularly an aircraft, as well as meeting the requirement for escape in air environment without compromise to the performance attained with a fully-developed system for achieving escape in such environment.

Thus, more specifically, an object of the invention is to provide an escape system based on an ejection seat, for instance the well-known Martin-Baker aircraft ejection seat, and which, without compromise to the performance attainable with such a seat in an air-environment ejection, provides for the performance of a sequence of operations specifically designed to meet the requirements for escape from a submerged aircraft when such escape has to be effected.

According to this invention there is provided an aircraft escape system including an ejection seat, means responsive to the initiation of ejection of the seat from the aircraft when submerged for performing at least one of the following functions—canopy unlocking and/or jettison, severing a seat-attached drawline associated with the airman's personal parachute mechanism, inflating a seat squab, inflating a backrest, inflating a life jacket worn by an airman, and disabling a drogue gun (if provided) on the seat.

According to one feature of this invention, the said means may include a container for pressure fluid and at least one pressure fluid-actuated device deriving operating pressure fluid from such source for performing the specified function or functions.

When two or more of said functions are required to be performed, the or each device for performing the required functions may be fed with pressure fluid from said container via a valve opened when the device is to perform its function(s); when sequential performance of two or more functions is required, the valve controlling the pressure fluid supply to a device that is to operate subsequent to the operation of another device may be embodied in such other device to be opened when the latter has performed its individual function(s).

In one form of escape system embodying the invention, the motive force for ejecting the ejection seat from the aircraft when submerged is supplied by pressure fluid stored in a suitable vessel and released to an ejection gun of the construction disclosed in my co-pending application Serial No. 258,831, to effect seat ejection, by means of a pressure-sensitive valve of the construction disclosed in my co-pending application Serial No. 258,-833, said pressure fluid also operating an initiating device controlling the supply of pressure fluid from the said container to the device or devices that perform the required function(s) specified in escape from the submerged aircraft.

In another form of escape system embodying the invention, however, pressure fluid stored in a suitable vessel is adapted to be released by a pressure-sensitive valve of the construction disclosed in my aforesaid application Serial No. 258,833 to be fed to an ejection gun of the construction disclosed in my aforesaid application Serial No. 258,831 and to a pressure fluid-operated device performing a required function for escape from a submerged aircraft, the ejection seat mechanism set in operation upon ejection being adapted to actuate a control valve, at a predetermined instant in the ejection sequence, to release pressure fluid from a seat-mounted container to one or more devices utilizing such pressure fluid to assist the seat occupant to evacuate the seat.

In a system according to the invention applicable to an aircraft having an infrangible cockpit canopy, the system may include a device for automatically unlocking and jettisoning the canopy; such device may conveniently be fluid-pressure actuated and in preferred arrangements the source of pressure fluid for actuating this device is the vessel that stores the ejection gun-operating pressure fluid although the container storing pressure fluid for other devices of the system could supply the pressure fluid for this device. If, however, the system is applicable to an aircraft having a canopy through which ejection may be effected, the seat may, if desired, be equipped instead with a canopy-breaker of the construction disclosed in my copending application Serial No. 258,831 to facilitate penetration of the canopy by the seat when the aircraft is submerged.

In order that the invention may be more readily understood, typical aircraft escape systems embodying the invention will be described by way of example and with reference to the accompanying drawings, in which:

FIGURE 5 is a circuit diagram corresponding with FIGURE 3 but illustrating the principal components of a second embodiment of an escape system in accordance with the invention.

Figure 1:
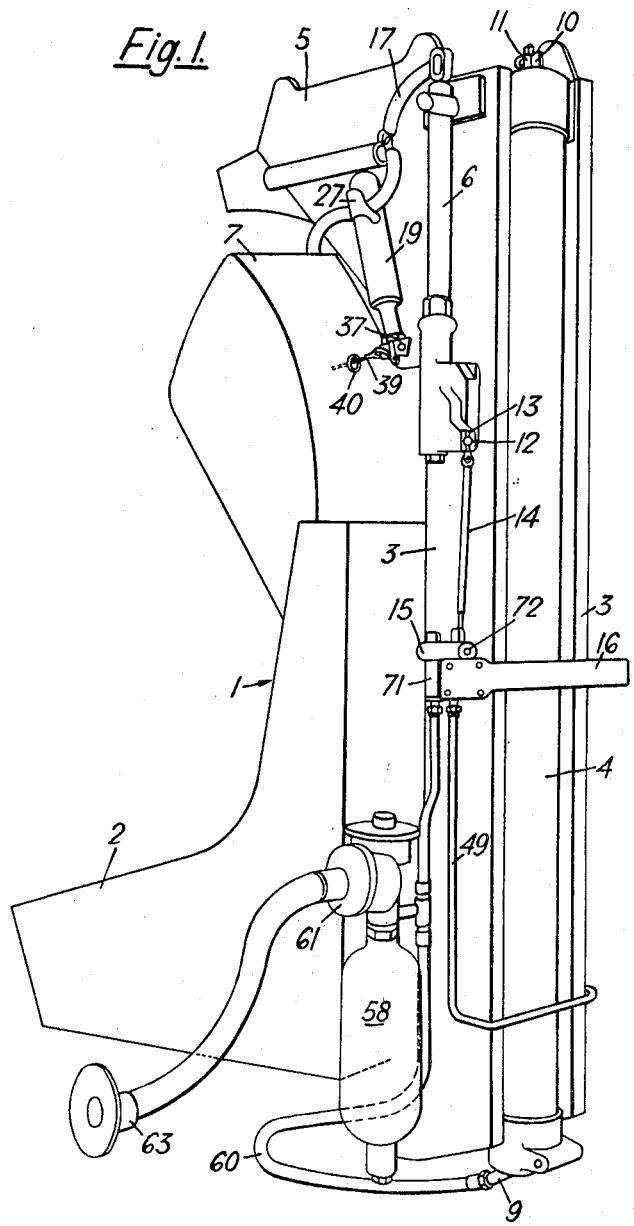
FIGURE 1 is a diagrammatic perspective view of one side of an aircraft ejection seat installation constituting one embodiment of an escape system in accordance with the invention.

Referring first to FIGURES 1 to 4 of the drawings, the escape system illustrated therein comprises an aircraft ejection seat generally indicated at 1 and typical of the aircraft ejection seats manufactured by Martin-Baker Aircraft Limited, this ejection seat being of the general construction disclosed in my Patent No. 2,708,083 and comprising a seat pan 2 mounted on guide rails 3 that embrace an ejection gun 4, the seat further comprising a head box 5 that forms a stowage for a drogue system (not shown) deployed, on ejection of the seat in air environment, by means of a drogue gun 6 as disclosed in my Patent No. 2,502,470, a seat-back 7 constituting a stowage for an inflatable backrest 8 (FIGURE 3) and for a personal parachute pack (not shown) for the seat occupant.

The ejection gun 4 is of the construction described in detail in the specification of my aforesaid co-pending application Serial No. 258,831 which, as explained in said application, is capable of being operated selectively by stored pressure fluid or by means of one or more cartridges to have characteristics appropriate for, respectively, escape from a submerged aircraft and escape in an air environment. The ejection gun is in the form of three telescopically interfitting cylinders, the outer cylinder 4a being anchored to the aircraft structure and incorporating, in its base, a pressure fluid inlet 9, whilst the upper end of the inner cylinder 4b of the ejection gun is fitted with a primary cartridge and firing mechanism including a sear 10 that is adapted to be withdrawn from a firing pin 11 by means of a connection (not shown) to a face blind (not shown) housed in the head box 5, the arrangement being such that when the face blind is withdrawn from the head box and pulled down over the face of the seat occupant the sear 10 is withdrawn from the firing pin 11 to fire the primary cartridge of the ejection gun.

The drogue gun 6 has a firing pin 12 restrained by a sear 13 which is coupled by a link 14 to an anchorage 15 supported by a bracket 16 that is fixed to the aircraft so that upon commencement of seat ejection the sear 13 is withdrawn from the firing pin 12 to fire the drogue gun and cause deployment of the drogue system.

The drogue system includes one or more drogues (not shown) and a drogue drawline, part of which is shown at 17, connected to the drogues, this drawline being secured at an intermediate point to the seat structure by means of a releasable shackle (not shown) that, at an appropriate instant in the ejection sequence, is opened by the operation of a sensing device 18 which at the same time actuate lugs (not shown) to release the seat occupant's seat harness from its attachments to the seat.

Figure 4:
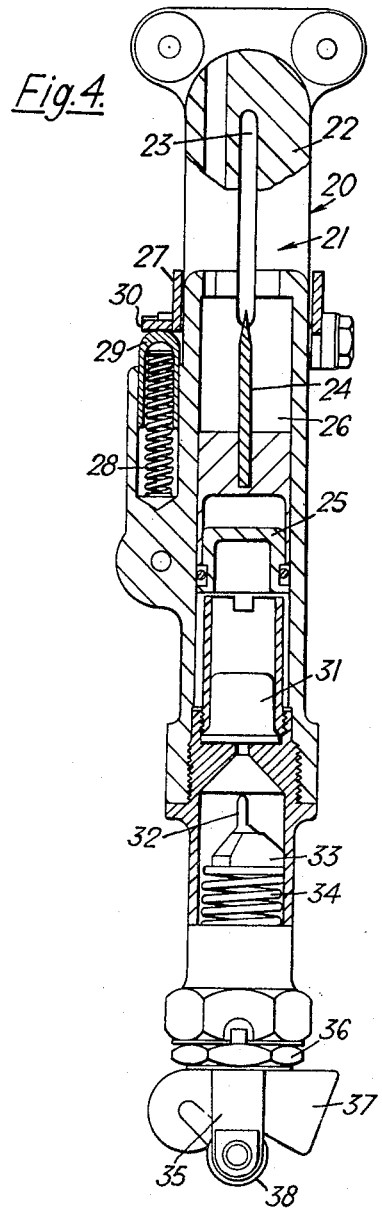
FIGURE 4 is a part-sectional elevation of a line-cutting device forming part of the installation of FIGURES 1 to 3.

The part 17 of the drogue drawline extends from the said releasable shackle to the ripping mechanism of the seat occupant's personal parachute, this part 17 extending through a line-cutting device 19, the construction of which is illustrated in FIGURE 4 and which, as shown in that figure, comprises a cutting-head 20 defining a recess 21 through which the drawline part 17 extends, the cutting-head 20 including an anvil 22 having a slot 23 to receive a knife blade 24 mounted on a piston 25 reciprocable within a cylinder 26 and normally positioned, as illustrated, so that the knife blade 24 is housed within the cylinder 26 and clear of the drawline extending through the recess 21.

The recess 21 is closed by a flap 27 that is pivotally mounted on the body of the device 19 and is spring-loaded into closed position by means of a spring 28 acting on a plunger 29 which engages a lug 30 on the flap 27, the arrangement being such that the drawline part 17 may be drawn from the recess 21 by displacement of flap 27 when the said releasable shackle is opened to enable the drag load of the drogue system to be applied to the drawline part 17, and thus to the ripping mechanism of the seat occupant's personal parachute to effect deployment of the latter.

The end of cylinder 26 remote from the cutting head 20 of the line-cutting device 19 is formed as a combustion chamber housing a cartridge 31 which may be fired by the impact of a firing pin 32 forming the head of a plunger 33 subject to the thrust of a spring 34, the plunger 33 having a bifurcated tail 35 which passes through a plug 36 and the limbs of which embrace a wedge-like sear 37 which co-operates with a roller 38 carried by the plunger tail 35, whereby withdrawal of sear 37 (to the left as seen in FIGURE 4) first causes retraction of plunger 33 to compress spring 34 and then releases the plunger to permit firing pin 32 to be impelled towards the cartridge 31.

As shown in FIGURE 1, the sear 37 is connected to a firing cable 39 that extends through a bush 40 in the seat back 7 and is connected to the parachute pack accommodated therein, so that the sear 37 is withdrawn to cause firing of cartridge 31 upon evacuation of the seat 1 by its occupant when attached to the personal parachute. Firing of cartridge 31 causes generation of expansive gases in the combustion chamber part of the cylinder 26 and propulsion of piston 25 towards the cutting-head 20, so that the knife blade 24 travels through the recess 21 and into the slot 23, thereby to sever the drogue drawline part 17 if, at this time, such drawline part is positioned in recess 21.

The ejection seat 1 is further equipped with a multi-service connector generally designated 41, which is generally of the construction disclosed in my Patent No. 3,032,299, consisting of three separable parts, namely an intermediate part 42 secured to the seat pan 2, a "personal" part 43 that mounts connectors for various personal services for the seat occupant, such as oxygen, G-suit pressurization, flying suit ventilation and telephony lines, and an "aircraft" part 44 also equipped with connectors for connection to the corresponding service lines of the aircraft, the "aircraft" part 44 having a release lever 45 connected by a static line 46 to an anchorage 47 on the aircraft, whereby such release lever will be operated to separate the part 44 from the part 42 upon ejection of the seat from the aircraft. The "personal" part 43 has a release lever 48 by means of which it may be released from part 42 when the seat occupant vacates the seat, the release lever being adapted to be operated by the sensing device 18 simultaneously with the release of the seat occupant's seat harness in the ejection sequence.

The connector 41, in addition to providing connections in the lines for personal services, such as mentioned above, also provides a connection in a line 49 that carries operating pressure fluid to a fluid control valve 50 of the construction disclosed in my co-pending application Serial No. 258,835 of even date which is secured to the head of a pressure fluid bottle 51 that contains the fluid, usually carbon dioxide, employed for inflating the inflatable bladder 52 within the seat occupant's life jacket.

The seat pan 2, in addition to housing the usual dinghy and survival pack (not shown) accommodates an inflatable seat squab 53. This is connected to a conduit 54, also connected to the inflatable back rest 8, extending to a pressure fluid container 55 mounted on the upper part of the ejection seat and having a valve 56 that is adapted to be opened by the movement of a plunger 57 of the sensing device 18 when this operates to release the seat harness of the seat occupant during the ejection sequence.

The escape system further comprises a primary pressure vessel 58 mounted on the aircraft and storing a suitable volume of compressed air at high pressure (e.g. 3000 lbs./square inch) for actuating the ejection gun 4 for ejection of the seat and its occupant from the aircraft when submerged. As explained in my aforesaid co-pending application Serial No. 258,831, the inner cylinder 4b of the gun 4 is fitted at its inner (lower) end with a disc 4c that divides the chamber defined by the gun cylinders and is blown out by the gases produced in the inner cylinder by firing of the primary cartridge at the upper end thereof for air-environment ejection so that such gases may expand within the gun chamber as a whole but which remains in place when compressed air is admitted to the base of the outer gun cylinder 4a so as to restrict the space available for expansion of such air as the gun extends, thereby to minimise the volume of high pressure air required to obtain the thrust/stroke characteristic appropriate for ejection of the seat and its occupant from the aircraft when submerged.

The pressure vessel 58 is fitted with a sealing disc 59 adapted to be ruptured, to release the stored air to a conduit 60 leading to the inlet 9 of the gun 4, by means of a pressure-sensitive mechanism 61 of the construction disclosed in detail in my co-pending application Serial No. 258,833. As explained in such application, the mechanism 61 comprises a diaphragm 62 exposed on one side to a pressure connection 63 in the aircraft skin 64, the diaphragm 62 responding to a predetermined (hydrostatic) pressure, for instance equivalent to a submersion of the aircraft to a depth of 10 feet, at connection 63 to rock a lever 65 out of engagement with a collar 66 on a spring-loaded plunger 67 mounting a firing pin 68 that upon release of the plunger 67 strikes and fires a cartridge 69 which projects a penetrating element 70 through the sealing disc 59 to rupture same.

Figure 3:
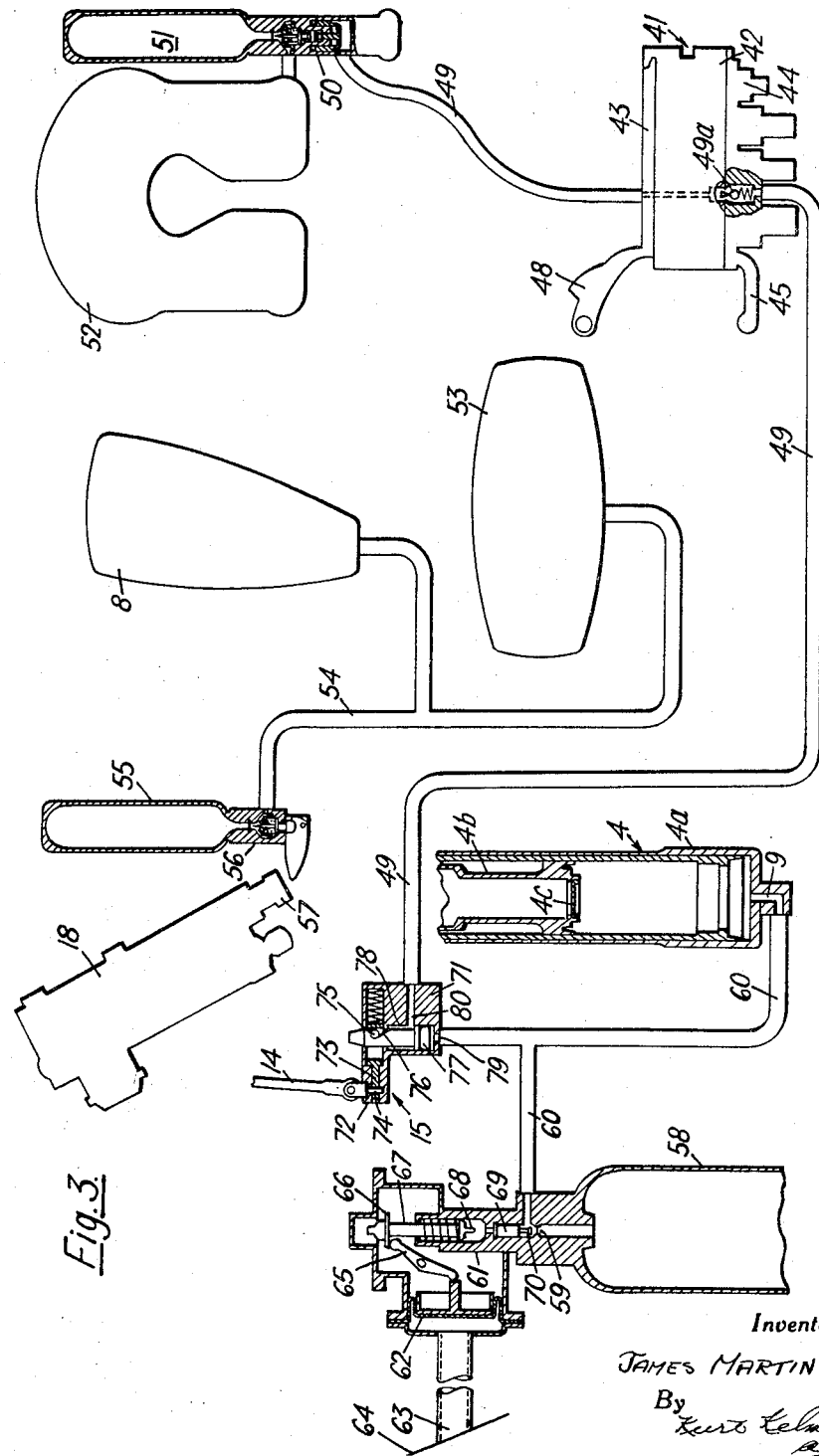
FIGURE 3 is a circuit diagram illustrating the principal components of the escape system of FIGURES 1 and 2.

The anchorage 15 for the drogue gun firing link 14 is constituted by a drogue gun-disabling device of the construction disclosed in my co-pending application Serial No. 258,836 of even date and which comprises a body 71 having a lateral boss 72 in which a plunger 73 is slidable, the plunger 73 normally extending through an eye 74 at the end of link 14 to anchor this to the boss 72. The plunger 73 is longitudinally slotted and fitted with a transverse pin 75 that co-acts with a ramp 76 on a piston 77 reciprocable in a cylinder 78 in the body 71, the cylinder having an inlet 79 connected to conduit 60 and an exhaust port 80 that is positioned to be uncovered by the piston 77 when this has been displaced (upwardly as seen in FIGURE 3) to effect withdrawal of plunger 73 from the eye 74 of the link 14. The exhaust port 80 is connected to the line 49 so that air from conduit 60 will be fed to line 49 when, as hereinafter described, the drogue gun-disabling device 15 has operated in the initial stages of ejection of the seat 1 and its occupant from a submerged aircraft.

The escape system as so far described with, if desired, the addition to the seat of one or more canopy breakers of, for instance, the construction disclosed in my aforesaid co-pending application Serial No. 258,832 is suitable for an aircraft equipped with a frangible or penetrable cockpit canopy through which ejection may be accomplished in the event that jettisoning of the canopy is impracticable. However, the system being described may be adapted for an aircraft having an infrangible cockpit canopy and, for this purpose, a device (not shown) similar to the drogue gun-disabling device 15 described above but adapted to unlock and effect, or initiate by releasing stored energy for the purpose, canopy jettisoning may be included in the conduit 60 extending from the pressure-sensitive valve 61 to the described drogue gun-disabling device 15 whereby the latter is prevented from operating until the canopy has been unlocked and jettison thereof effected or initiated.

From the foregoing description, it will be understood that upon submersion of an aircraft equipped with the escape system to a depth sufficient to cause opening of the pressure-sensitive valve 61 of the compressed air storage vessel 58, the cockpit canopy, if infrangible, is first unlocked and jettisoned, and thereafter (or immediately if the canopy is penetrable), the drogue gun-disabling device 15 is operated to disable the drogue gun 6 while air flows from the storage vessel 58 to the ejection gun inlet 9 to initiate ejection of the seat without operation of the drogue gun.

Immediately upon disablement of the drogue gun by operation of device 15, air flows via line 49 to the valve 50 of the life-jacket inflating bottle 51 to operate such valve to initiate inflation of the bladder 52 of the seat occupant's life jacket. It will be noted that the multi-service connector 41 includes a valve 49a in the connection of line 49 in the part 44, this valve closing upon separation of part 44 from part 42 so as to prevent loss of air pressure from line 49 during the latter part of the stroke of the ejection gun 4.

The seat and its occupant are thus ejected from the aircraft, the occupant's life jacket being inflated during such ejection.

The sensing device 18 operates a predetermined time after ejection of the seat 1 commences, opening valve 56 of the container 55, releasing the "personal" part 43 of the connector 41 from part 42 thereof, releasing the drogue system drawline from its shackle on the seat and releasing the seat harness to free the occupant from the seat. Air from container 55 inflates the backrest 8 and the seat squab 53 to evict the occupant from the seat, the line-cutting device 19 being operated by such movement of the seat occupant, thereby to sever the drogue drawline part 17 to free the seat occupant from the (undeployed) drogue system.

It will thus be understood that ejection of the seat and its occupant occurs automatically upon submersion of the aircraft to a predetermined depth, the seat occupant being automatically freed and evicted from the seat, immediately following ejection, with an inflated life jacket. The occupant's survival, even if injured or unconscious, following immersion of the aircraft may be expected.

It should further be understood that the described escape system in no way compromises the performance of the ejection seat and its systems in normal, air-environment escape from the aircraft. Indeed, the inflatable backrest 8 and seat squab 53 that are inflated by the sensing device 18 whenever this is operated assist the occupant separating from the seat following air-environment ejection.

FIGURE 5 shows, in manner similar to FIGURE 3, the components, and their interconnections, of a variant of the escape system of FIGURES 1 to 4. The escape system of FIGURE 5 differs from that of FIGURES 1 to 4 in few respects and components identical in disposition and function to corresponding components of the system of FIGURES 1 to 4 are identified by the same references and will not be further described. Moreover, components differing only in details of construction are identified by corresponding references bearing the suffix "a."

Figure 2:
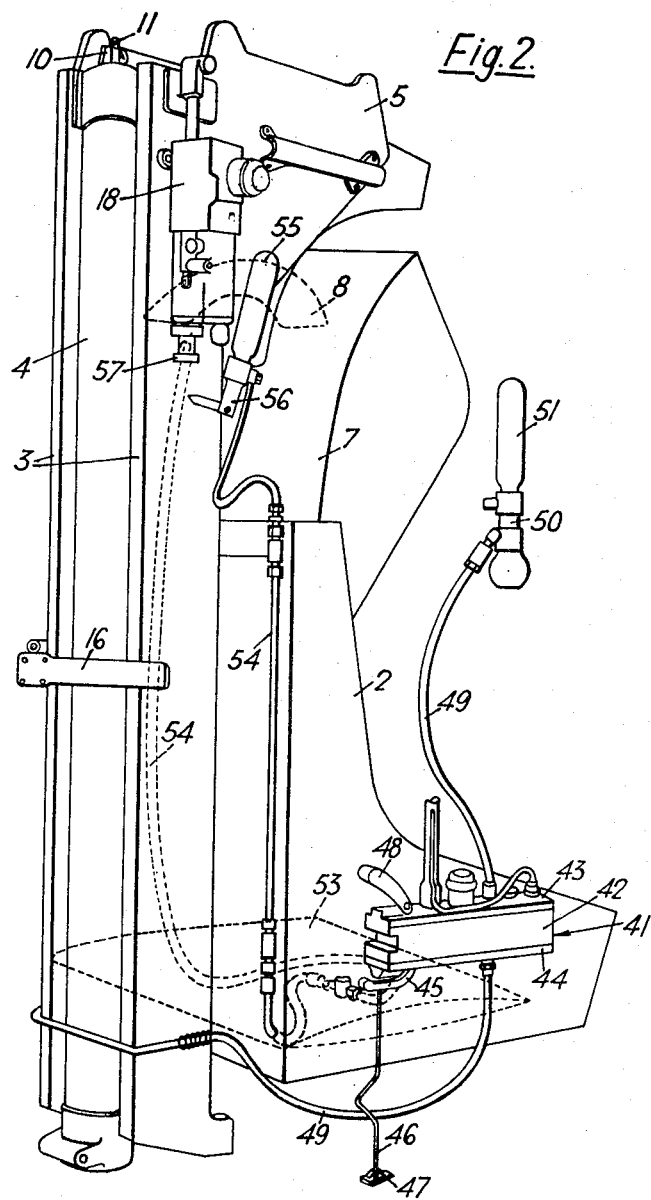
FIGURE 2 is a diagrammatic perspective view of the other side of the installation of FIGURE 1.

Thus the escape system of FIGURE 5 comprises an ejection seat (not shown) corresponding with the ejection seat 1 of FIGURES 1 and 2, the seat being equipped with an ejection gun 4 of the previously described construction and which may, for ejection of the seat from a submerged aircraft, be extended by compressed air stored in a pressure vessel 58 and released therefrom by the operation of a pressure-sensitive mechanism 61 of the previously described construction and which responds to submersion of the aircraft to a predetermined depth as previously explained.

As in the system of FIGURES 1 to 4, the drogue gun firing link 14 of the ejection seat is attached to the aircraft structure by an anchorage 15 of the construction previously described so as to be released upon release of compressed air from the vessel 58 to the conduit 60. However, in the system of FIGURE 5, the drogue gun-disabling device constituting the anchorage 15 performs two functions additional to that performed by the device in the system of FIGURES 1 to 4.

Thus the device 15 of FIGURE 5 controls the admission of compressed air to the ejection gun inlet 9, the latter being connected by conduit 60a to the exhaust port 80 of the device 15 instead of directly to the conduit 60 as in the system of FIGURES 1 to 4, whereby air from vessel 58 may flow to the gun inlet 9 only after the device 15 has been operated, by compressed air released to conduit 60, to release the drogue gun firing link 14 and to perform its third function described below. Thus commencement of seat ejection from a submerged aircraft is positively delayed until the drogue gun of the seat has been disabled.

The third function of the device 15 is that of operating the valve 56 of the pressure fluid container 55. For this purpose, the container 55 is relocated on the seat structure so as to have its valve 56 positioned adjacent to the exposed end 77a of the piston 77 of the device 15, whereby such valve 56 will be opened when the piston 77 performs its firing link-releasing stroke. It will be understood that this modification of the system of FIGURES 1 to 4 results in earlier opening of valve 56, the valve 56 being opened concurrently with the admission of compressed air to the gun inlet 9 instead of subsequently to ejection of the seat as in the system of FIGURES 1 to 4.

The system of FIGURE 5 further differs from that of FIGURES 1 to 4 in the form of the line-cutting device and in the operating pressure fluid supply to the valve 50 of the life-jacket inflation bottle 51.

Thus in the system of FIGURE 5, the line-cutting device 19a is of the construction described in detail in my co-pending application Serial No. 258,836 of even date which, as disclosed in such application, is generally similar to the device 19 shown in FIGURE 4 but is equipped with a pressure fluid inlet 81 in the cylinder 26 and a pressure fluid outlet 82 so positioned in the cylinder 26 as to be uncovered by the piston 25 when this has completed its stroke in the line-cutting direction, whereby such stroke of piston 25 establishes communication between inlet 81 and outlet 82. Thus, as explained in the aforesaid specification, the line-cutting stroke of the piston 25 can be caused either by admission of pressure fluid to cylinder 26 via inlet 81 or by firing of a cartridge equivalent to cartridge 31 of the device 19 by operation of a firing mechanism, arranged as shown in FIGURE 4, in response to evacuation of the seat by an occupant wearing the personal parachute pack.

The pressure fluid line 54 from valve 56 of the container 55 is connected, in the system of FIGURE 5, to the inlet 81 of the line-cutting device 19a whereby such device is operated upon opening of valve 56 by the operation of the device 15 as explained above. The outlet 82 of the device 19a is connected to a line 54a leading to the inflatable backrest 8 and to the inflatable seat squab 53, an extension of line 54a leading to a connection 83 on the seat-attached part 42a of the multi-service connector 41.

The multi-service connector 41, as in the system of FIGURES 1 to 4, includes in its "personal" part 43, a connection for the line 49 to the valve 50. However, since in this system the line 49 does not extend to an aircraft-mounted source of pressure fluid, e.g. the vessel 58 via device 15, as in the system of FIGURES 1 to 4, there is no corresponding connection for line 49 in the "aircraft" part 44a of the connector 41. Instead, the seat-mounted part 42a includes a passage 84 communicating with the connection 83 for line 54a, the passage 84 housing valve 49a to seal such passage upon separation of part 43 from part 42a.

Thus, as is evident from FIGURE 5, the line 49 is coupled, via the connector 41, to the line 54a and thence via the line-cutting device 19a with the line 54 and the seat-mounted pressure fluid container 55.

From the foregoing description it should be clear that upon submersion of an aircraft, equipped with the escape system of FIGURE 5, to a depth sufficient to operate mechanism 61 to release air from vessel 58, the device 15 is first operated to disable the drogue gun of the seat, to open valve 56 of container 55, and to place conduit 60 in communication with conduit 60a and the inlet 9 of the ejection gun 4. As a consequence of these functions, the gun 4 commences to extend to eject the seat and its occupant from the aircraft whilst pressure fluid from container 55 first operates the line-cutting device 19a and then commences to inflate the backrest 8 and the seat squab 53 while actuating valve 50 to initiate inflation of the bladder 52 of the seat occupant's life jacket.

Accordingly, upon ejection of the seat from the aircraft, actuation of the sensing device 18 of the seat may occur to release the occupant's seat harness and to effect separation of part 43 from part 42a of the multi-service connector, thereby to free the seat occupant from the seat for eviction therefrom with inflated life-jacket, by the expansion of backrest 8 and seat squab 53.

Ordinarily, the cartridge of the line-cutting device 19a will be fired at this time with, however, no effect beyond increasing the pressure in line 54a and in the backrest 8 and seat squab 53. However, such firing of the line-cutting device cartridge also occurs in the course of an air-environment ejection, the firing in such circumstances actuating the device 19a to sever the drogue drawline if, for some reason, this has not been pulled clear of the device 19a in earlier stages of the ejection sequence.

I claim:

1. An aircraft escape system comprising, in combination: an ejection seat including an ejection gun operable by fluid pressure for ejecting such seat from an aircraft; a source of pressure fluid; means responsive to predetermined hydrostatic pressure outside the aircraft to release pressure fluid from said source to the ejection gun to operate same; and pressure fluid-actuated means responsive to such released pressure fluid for disabling a drogue gun on the seat.

2. An aircraft escape system comprising, in combination: an ejection seat including an ejection gun operable selectively by cartridge-generated gas and by stored pressure fluid, a drogue gun and drogue means deployable by such drogue gun, and a static link for firing said drogue gun in response to ejection of the seat; a storage vessel for pressure fluid; means responsive to predetermined hydrostatic pressure outside said aircraft to release pressure fluid from said vessel to said ejection gun to operate same; and pressure fluid-actuated means powered by such released pressure fluid for disconnecting said static link thereby to disable said drogue gun.

3. The escape system of claim 2, in which said ejection seat includes releasable seat harness attachments and a sensing device responsive to seat ejection to release said attachments, a pressure fluid container on said seat, a valve operable by said sensing device to release fluid from said container, an inflatable back rest and an inflatable seat squab; and conduit means connecting said valve to said back rest and to said seat squab.

4. The escape system of claim 2, in which said ejection seat includes a multi-service connector separable on seat ejection and having a connection for a pressure fluid line adapted to be pressurized by fluid released from said storage vessel, the system further comprising an inflatable life jacket for the seat occupant, a bottle storing pressure fluid for inflating such life jacket, a valve operable by fluid pressure to release inflating fluid from said bottle to said life jacket, said pressure fluid line extending to said valve via said multi-service connector.

5. The escape system of claim 2, in which said ejection seat includes a storage container for pressure fluid on the seat, a control valve for releasing fluid from such container and operable by said drogue gun-disabling pressure fluid-actuated means, an inflatable back rest, an inflatable seat squab, and conduit means connecting said control valve to said back rest and to said seat squab.

6. The escape system of claim 5, in which said ejection seat includes a three-part multi-service connector having a personal part separable from a seat-mounted part, the system further comprising an inflatable life jacket for the seat occupant, a bottle storing pressure fluid for inflating such life jacket, a fluid pressure-actuated inflation valve for releasing inflating fluid from said bottle to said life jacket, and an operating pressure fluid line extending from said inflation valve to said conduit means via co-operating connections on said personal and seat-mounted parts of said multi-service connector.

7. The escape system of claim 6, including a personal parachute for the seat occupant, a drawline extending from said drogue means to a releasable attachment on the seat and thence to deploying mechanism for said personal parachute, and a pressure fluid-operable line-cutting device connected to said conduit means for severing said drawline at a point between said parachute deploying mechanism and said releasable attachment.

8. The escape system of claim 7, in which said line-cutting device is interposed in said conduit means to isolate, until such device is operated, said back rest, seat squab and operating pressure fluid line from said control valve.

References Cited by the Examiner
UNITED STATES PATENTS

| | | | |
|---|---|---|---|
| 2,569,638 | 10/51 | Martin | 244—122 |
| 2,638,293 | 5/53 | Lindstrom | 244—122 |
| 2,693,326 | 11/54 | Lobelle | 244—122 |
| 2,813,690 | 11/57 | Holmes | 244—122 |
| 2,953,331 | 9/60 | Holcomb et al. | 244—122 |
| 2,977,078 | 3/61 | Fitt | 244—122 |
| 2,982,502 | 5/61 | Martin | 244—122 |
| 3,027,126 | 3/62 | Wallace | 244—141 |
| 3,036,799 | 5/62 | Martin | 244—122 |

FERGUS S. MIDDLETON, *Primary Examiner.*